May 1, 1956 R. M. WILMOTTE 2,744,247

SYSTEM FOR DERIVING THE MODULATION OF ONE FREQUENCY MODULATED WAVE IN THE PRESENCE OF ANOTHER CO-CHANNEL FREQUENCY MODULATED WAVE

Filed Jan. 24, 1950 2 Sheets-Sheet 1

INVENTOR.
RAYMOND M. WILMOTTE
BY Hyman Hurvitz
his atty.

SYSTEM FOR DERIVING THE MODULATION OF ONE FREQUENCY MODULATED WAVE IN THE PRESENCE OF ANOTHER CO-CHANNEL FREQUENCY MODULATED WAVE

Filed Jan. 24, 1950

INVENTOR.
RAYMOND M. WILMOTTE
BY Hyman Hurwitz
his atty.

2,744,247

SYSTEM FOR DERIVING THE MODULATION OF ONE FREQUENCY MODULATED WAVE IN THE PRESENCE OF ANOTHER CO-CHANNEL FREQUENCY MODULATED WAVE

Raymond M. Wilmotte, Washington, D. C., assignor to Padevco, Inc., Washington, D. C., a corporation of Delaware Application January 24, 1950, Serial No. 140,241

10 Claims. (Cl. 343—206)

The present application is related in concept and subject matter to my applications Serial #133,871, filed December 19, 1949, Patent No. 2,684,439 dated July 20, 1954, and entitled "FM Systems I," and Serial #133,872, filed December 19, 1949, Patent No. 2,654,885, dated October 6, 1953 and entitled "FM Systems II."

The present invention relates generally to apparatus and methods for the separation of signals overlapping in frequency, and more particularly to methods and apparatus for selectively separating two overlapping frequency modulated carriers.

It is a broad object of the present invention to provide novel methods and apparatus for selectively separating two frequency modulated signals which overlap in frequency and which are of different amplitudes.

It is another broad object of the invention to provide a system for detecting modulation inherent on a first frequency modulated carrier in the presence of another stronger, overlapping frequency modulated carrier.

It is still another broad object of the invention to provide a system for detecting modulation inherent on a first frequency modulated carrier in the presence of another weaker overlapping frequency modulated carrier, without substantial interference from the latter.

It is a further broad object of the invention to provide novel methods and apparatus for separating two frequency modulated signals, which overlap in frequency, and which are of different amplitudes, and for providing output responsive to each of the frequency modulated signals without substantial interference from the other.

The above and still further objects, features and advantages of the invention will become apparent upon consideration of the following detailed description of a specific embodiment thereof, especially when taken in conjunction with the accompanying drawings, wherein.

Suppose two signals, which may be represented, in respect to instantaneous values, by $$E_1=\sin wt; E_2=a \sin (w+q)t$$

where $a<1$ and $q$ is the instantaneous difference in the frequencies of the signals, and which may be positive or negative, at random, as time proceeds.

The sum of the two signals is (1) $$E=E_1+E_2=R \sin (wt+\alpha)$$

where (2) $$R^2=1+a^2+2a \cos qt$$

and (3) $$\tan \alpha=\frac{a \sin qt}{1+a \cos qt}$$

Figure 1:
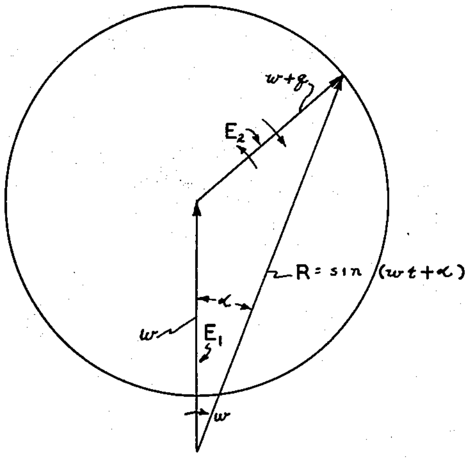
Figure 1 is a vector diagram useful in explaining the invention illustrated in Figures 2 and 3.

Referring specifically to Figure 1 of the accompanying drawings, there is illustrated the vectors $E_1+E_2$, added together, and labelled in respect to the significance of the various parameters of Equations 1–3 inclusive. In the discussion which follows it is taken that $qt=0$ when $E_2$ is collinear with and directed in the same sense as $E_1$, i. e., at the crests of the beat frequencies.

It may be shown, then, that (4) $$\frac{d(wt+\alpha)}{dt}=w+\frac{aq(a+\cos qt)}{R^2}$$

(5) $$\frac{dR}{dt}=-\frac{aq \sin qt}{R}$$

(6) $$=-q \sin \alpha$$

(7) $$Rd\frac{(wt+\alpha)}{dt}=Rw+\frac{aq(a+\cos wt)}{R}$$

(8) $$\int_0^{\psi} Rd\frac{(wt+\alpha)}{dt}d(qt)=2(1+a)E(\psi/2,k)w+[(1+a)E(\psi/2, k)-(1-a).F(\psi/2, k)]q$$

where $$k^2=\frac{2a}{(1+a)^2}$$

When the values of the quantities $$Rd\frac{(wt+\alpha)}{dt}+Rd\frac{(wt+\alpha)}{dt}$$

are calculated for certain values of $qt$, the following Table I may be constructed. This table gives the values of the quantities in terms of $a$, and of signals derivable from $q$ and $w$ by frequency discrimination when $$qt=\pm\frac{\pi}{2}$$

0 and $\pi$ radians and for two further values, i. e., for the difference and the sum of the quantities, taken at 0 and $\pi$ radians.

*Table I*

| $qt$ | (1) $\pm\pi/2$ | (2) 0 | (3) $\pi$ | (4) $(0)-(\pi)$ | (5) $(0)+(\pi)$ |
|---|---|---|---|---|---|
| (a) R | $\sqrt{1+a^2}$ | $1+a$ | $1-a$ | $2a$ | 2 |
| (b) $d(wt+\alpha)/dt$ | $w+\frac{qa^2}{1+a^2}$ | $w+\frac{qa}{1+a}$ | $w-\frac{qa}{1-a}$ | $\frac{2qa}{1-a^2}$ | $2w-\frac{2qa^2}{1-a^2}$ |
| (c) $Rd(wt+\alpha)/dt$ | $\sqrt{1+a^2}.w+\frac{qa^2}{\sqrt{1+a^2}}$ | $w(1+a)+qa$ | $w(1-a)-qa$ | $2a(w+q)$ | $2w$ |

It is apparent, from Equation 2 that $R^2$ varies with cos $qt$, which means that the superposed waves $E_1$ and $E_2$, in the sum, are amplitude modulated in accordance with a cosine function at the frequency $q$. This is also intuitively obvious from Figure 1. The frequency $q$ can readily be derived, then from the superposed waves by means of an amplitude detector. Values of $$d\frac{(wt-\alpha)}{dt}$$

may be measured by means of a limiter and discriminator.

In accordance with the present invention, selected portions of the radio frequency envelope of the superposed waves may be gated under the control of the modulation wave at frequency $q$ to obtain the frequency $$d\frac{(wt+\alpha)}{dt}$$

for only the angles or values of $qt$ specified in Table I, columns 1, 2, 3. When so obtained simple voltage combinations provide the quantities specified in columns 4 and 5.

Additionally, the quantity $$Rd\frac{(wt+\alpha)}{dt}$$

may be derived at the angles specified in columns 1, 2 and 3 by multiplying the value of R at these angles by the value derived for $$d\frac{(wt+\alpha)}{dt}$$

at these angles, in a conventional multiplier, the value of R being maintained by suitably gating the result of amplitude detecting the superposed waves. The values required for columns 4 and 5 may be derived by simple subtraction or addition of voltages, as required.

Additionally, and still further, the quantity $$Rd\frac{(wt+\alpha)}{dt}$$

may be derived at the angle specified in columns 4 and 5 of Table I by deriving the function $$d\frac{(wt+\alpha)}{dt}$$

for all angles, and by deriving the function R for all angles, multiplying the two functions to obtain $$Rd\frac{(wt+\alpha)}{dt}$$

and then gating the product function at values of $qt$ equal to zero and $\pi$, subtracting the results obtained at angles 0, $\pi$, to obtain an audio signal corresponding with $2a(w+q)$, as indicated in column 4, line C of Table I, and adding the values obtained at angles 0 and $\pi$ to obtain an audio signal corresponding with $2w$, as indicated in column 5, line C.

The last mode of operation is the mode of operation adopted in the presently described and preferred embodiment of the invention.

Reference is first made to Figure 1 of the drawings wherein is illustrated a vector diagram of the voltages applied to the input of the system, these voltages constituting a vector $E_1$ and a further vector $E_2$, the vector $E_2$ being the smaller, and the ratio of amplitudes of the vectors $E_2$ to $E_1$ being equal to $a$. The vector $E_1$ is assumed to have an instantaneous frequency $w$, while the vector $E_2$ is assumed to have an instantaneous frequency different from $w$, its total frequency being equal to $w\pm q$, and accordingly its angular velocity with respect to the vector $E_1$ being represented by $\pm q$. The sum of the vectors $E_1$ and $E_2$ is then represented by the vector R, which will be seen from the diagram to vary constantly in amplitude and to have a continually changing phase variation with respect to the vector $E_1$, which is due to the superposition of the vectors $E_1$ and $E_2$. The instantaneous angle between the vectors $E_1$ and R may be represented as $\alpha$.

It will be clear, then, that by applying the wave R to an amplitude detector of conventional character the envelope of the wave R may be obtained. This envelope varies in amplitude at a slow rate relative to the frequencies $w$ or $w+q$, in general, and the envelope accordingly is representative of amplitude variations of R.

It will further be clear that by applying the vector R, considered as a frequency modulated and phase varying wave, to a conventional limiter and discriminator, amplitude variations of R may be substantially removed, retaining frequency variations thereof. The discriminator will then produce voltage outputs proportional to the angular rate of change of R, or equal to $$d\frac{(wt+\alpha)}{dt}$$

Further, since the beat envelope may be assumed to have a zero angle for $qt$ at the peaks of the envelope and a value of $\pi$ for the angle $qt$ at its troughs, suitable gating tubes, which gate on the basis of amplitude differences, may be utilized to derive gating pulses at times $qt=0$ and $qt=\pi$. The wave representing the envelope of R and the wave representing $$d\frac{(wt+\alpha)}{dt}$$

may be multiplied in any of many well known multiplier circuits to obtain the product function $$Rd\frac{(wt+\alpha)}{dt}$$

The gating pulses may then be utilized to transfer the values of the product function to a summation circuit at times corresponding with $qt=0$ and $qt=\pi$, the output of the summation circuit being attributable to $2w$, as is indicated in Table I. Similarly the product function $$Rd\frac{(wt+\alpha)}{dt}$$

may be applied to a subtraction circuit at times corresponding with angles $qt=0$ and $\pi$, in response to the gating pulses, and the output of the subtraction circuit will then be attributable to $2a\ (w+q)$, as indicated in Table I.

Figure 2:
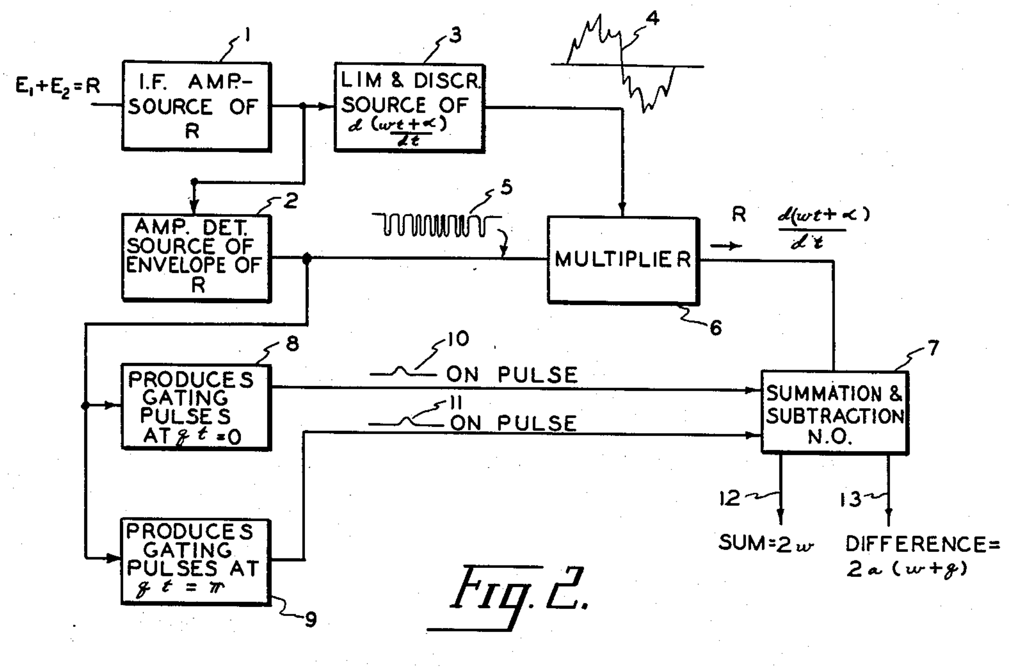
Figure 2 is a functional block diagram of an embodiment of the invention.
Figure 3:
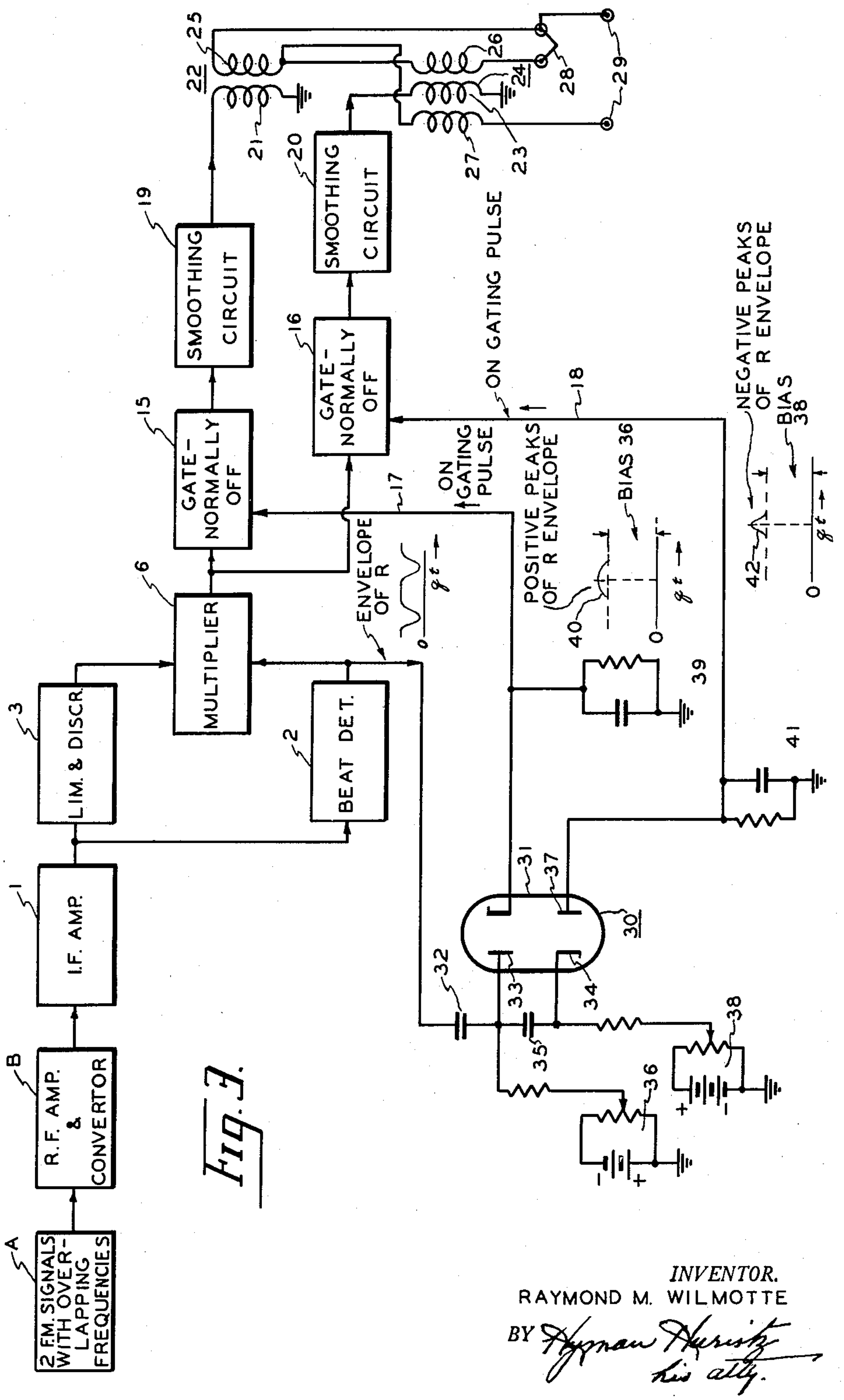
Figure 3 is an expanded block diagram corresponding generally to the block diagram of Figure 2.

Reference is made, accordingly, to Figure 2 of the drawings which illustrates in functional block diagram, and in simplified form, the essential elements of the embodiment of the present invention, which is illustrated in greater detail in Figure 3 of the accompanying drawings. Referring now to Figure 2 of the drawings the reference numeral 1 indicates an intermediate frequency amplifier, which may form part of a conventional FM receiver. The pass band of the receiver and of the I. F. amplifier must be sufficiently wide to pass all frequency variations, corresponding with vectors $E_1$ and $E_2$, occurring simultaneously. Accordingly, at the output of the I. F. amplifier 1 is present the vector R as a frequency modulated wave, without loss of any frequency components inherent therein by virtue of the superposition of the vectors $E_1$ and $E_2$.

The output of the I .F. amplifier 1 may then be applied to an amplitude detector 2, which provides at its output the amplitude envelope of the vector R. Similarly, the output of the I. F. amplifier 1 may be applied to a limiter and discriminator 3, which generates at its output a voltage proportional to $$d\frac{(wt+\alpha)}{dt}$$

The latter wave is illustrated at 4 in Figure 2, the sharp spikes on this figure representing the rapid and wide frequency deviations occurring when $E_1$ and $E_2$ overlap in opposite directions. The wave form 5, on the other hand, represents amplitude variations of the vector R or of the beat envelope of the superposed waves $E_1$ and $E_2$.

The output of the amplitude detector 2 and of the limiter and discriminator 3 are applied to a conventional multiplier circuit 6, which provides at its output a wave corresponding with the function $$Rd\frac{(wt+\alpha)}{dt}$$

and this wave is applied to a circuit 7, which may provide two outputs, one corresponding with the sum of voltages applied thereto and the other corresponding with the difference of voltages applied thereto. The summation and subtraction circuits contained in the block 1 may be assumed to be normally inoperative and to require for rendering them operative "on" pulses, which may be provided thereto by two gating wave generators 8 and 9.

The gating wave generator 8 may be comprised of a biased diode which passes only voltages exceeding a predetermined bias voltage applied to the diode. Similarly the gating wave generator 9 may comprise a diode which is biased to pass pulses only when the voltage applied thereto is less than a predetermined minimum value established by a bias source. Accordingly, the gating wave generator 8 produces "on" pulses 10 while the gating generator 9 produces "on" pulses 11. The "on" pulses 10 are produced at times corresponding with $qt=0$, while the "on" pulses 11 are produced at times corresponding with $qt=\pi$, since it is at those times, respectively, that the amplitude of the R wave attains its maximum and its minimum values respectively.

The summation and subtraction circuit 7, being turned on at times when $qt=0$ and $\pi$, produces then at its output terminals, or on leads 12 and 13, the sum frequency representing the output of the multiplier 6 taken at the times of occurrence of the pulse 10, added to the value of the output of multiplier 6 taken at the times of the pulses 11, while the voltage present on the difference output lead 13 represents the difference between the values of the outputs of the multiplier circuit 6 at times corresponding with the times of occurrence of the pulses 10 and those corresponding with the times of occurrence of the pulses 11. The outputs are maintained continuous or smoothed by means of suitable time constants in the circuit, or by some special circuit. As indicated in the drawings the sum and difference voltages are audio signals representative, respectively, of the frequencies $w$ and $w+q$.

Reference is now made to Figure 3 of the accompanying drawings for a more detailed circuit diagram, illustrating an actual circuit arrangement and details corresponding with the block diagram of Figure 2 of the drawings. In Figure 3 of the drawings reference letter A represents a co-channel frequency modulated signal source, or a signal source which provides signals $E_1$ and $E_2$, each of which is frequency modulated, and which are assumed to be overlapping and of different amplitudes. The output of the source A is applied to a radio frequency amplifier and converter B in accordance with conventional practice in superheterodyne receivers. The output of the radio frequency amplifier and converter B is applied then to an intermediate frequency amplifier 1, from which the beat envelope corresponding with the vector R is applied to the amplitude detector 2 and to the limiter and discriminator 3, as in Figure 2 of the drawings. The output of the limiter and discriminator 3 is a voltage function corresponding with or proportional to $$d\frac{(wt+\alpha)}{dt}$$

The output of amplitude detector 2 is accordingly a wave form 5 representing amplitude variations of the vector R in one direction only, and in envelope form, as represented by the wave form 5.

The multiplier 6 may be any suitable multiplier known in the art such as those disclosed in U. S. Patents #2,306,456 issued to W. H. Mayne or #2,401,447 issued to F. P. Wipf. The output of the limiter-discriminator 3 is applied to one input terminal of multiplier 6. The output of the detector 2 is coupled to the remaining input terminal of multiplier 6. The multiplier 6 then produces a product voltage proportional to $$Rd\frac{(wt+\alpha)}{dt}$$

The product voltage is applied in parallel or co-phasally to two gates 15 and 16, which are normally closed, and which may be opened in response to control signals. The gates 15 and 16, in one very simple form, may comprise triodes, or the like, biased beyond cut-off by means of bias resistances connected respectively in the cathode circuits thereof, so that in the absence of positive gating pulses, which may be applied over leads 17 and 18, respectively, no output is provided by either gate 15 or 16 in response to the voltages deriving from multiplier 6, and in response to such gating pulses the signals may appear.

At the output of gate 15 is then present, if the latter is gated on at times when $qt=0$, by gating pulses supplied over lead 17, pulses having each an amplitude corresponding with that obtainable by frequency detecting a frequency $w\ (1+a)+qa$, in accordance with row C, column 2 of Table I. At the output of gate 16, if the latter is gated on at times when $qt=\pi$, by gating pulses supplied over lead 18, pulses having each an amplitude corresponding with that obtainable by frequency detecting a frequency $w\ (1-a)-qa$.

These output pulses derivable from gates 15 and 16 may then be smoothed by means of smoothing circuits 19 and 20, to provide continuously varying waves. The rate of pulsation varies over such wide ranges of values that it has been found inadvisable to use filters as smoothing circuits, although such use is possible, and use may accordingly be made of the smoothing circuit illustrated and described in U. S. Patent #2,466,705 issued to Hoeppner, or some similar electronic smoothing circuit, of which a conisderable number are well known in the prior art, the mode of application of the Hoeppner circuit to the present disclosure being, for example, that illustrated in Figure 2 of my co-pending application, entitled "FM Systems I," and filed December 19, 1949, Serial No. 133,871.

Coupled to the primary winding 23 is a further secondary winding 27, so wound that the phase of its output voltage is opposite to that of the voltage generated in secondary winding 26. The windings 25 and 27 are connected in series, so that their outputs are subtractive.

Following Table I then, there is available at terminals 28 a signal corresponding with that which would be obtained by frequency detecting $2w$, while at the terminals 29 is available that voltage which would be obtained by detecting $2a(w+q)$. Since the frequency detection process is one of measuring frequency deviations from a mean or carrier frequency, and the detected result is not affected as to content by the maximum deviation which occurs over a period of time, the signals provided at terminals 28 and 29 are precisely the modulations of the overlapping frequency modulated carriers $E_1$ and $E_2$, respectively.

The gating waves which are applied to gates 15 and 16 via leads 17 and 18 are derived from a gating wave generator, generally denoted by the reference numeral 30, and comprising a double diode 31, coupled to the output of beat detector 2 via coupling condenser 32, in inverse sense, i. e., with an anode 33 of one section of tube 31, and a cathode 34 of the other section coupled to the beat detector 2, the anode 33 and the cathode 34 being mutually insulated with respect to D.-C. by condenser 35, while being coupled for A.-C.

Anode 33 is biased negatively with respect to ground by an adjustable bias source 36, while cathode 34 is similarly positively biased with respect to ground by a similar adjustable bias source 38. Accordingly, that section of double diode which includes anode 33 passes current when the detected beat wave R or the envelope of R exceeds in a positive sense the negative bias voltage developed by bias source 36, and the remaining section passes current when the envelope of R exceeds in a negative direction the positive bias voltage developed by source 38.

The envelope of R, in passing through coupling condenser 32, and coupling condenser 35, becomes an alternating voltage, by deletion of its D.-C. component. Hence its positive peaks occur when $qt=0$ and its negative peaks when $qt=\pi$. The bias sources 36 and 38 may be adjusted manually to provide such bias that only small portions of the envelope of R are passed to the leads 17 and 18.

Output voltage for lead 17 is developed across parallel R-C circuit 39 connected between lead 17 and ground, and consists of successive positive pulses 40. Similarly output voltage for lead 18 is developed across parallel R-C circuit 41, connected between ground and anode 37, and consists of successive positive pulses 42, occurring at times corresponding with or centered about troughs of the envelope of R.

While I have disclosed a specific embodiment of the present invention, for purposes of exemplification, it will be clear that variations thereof may be resorted to without departing from the time scope of the invention. In particular, the use of transformers for adding and subtracting signals may be dispensed with, a variety of alternative algebraic adding circuits being well known to the art.

What I claim and desire to secure by Letters Patent of the United States is:

1. In combination, a source of two overlapping frequency modulated waves having a beat envelope $R \sin (wt+\alpha)$, where $w$ is the instantaneous angular frequency of one of said waves, and $\alpha$ the phase angle between the vector representative of said one of said waves and the vector representative instantaneously of the sum of said waves, and where $q$ is the angular beat frequency between said waves, means for deriving a first voltage proportional to the envelope of $R \sin (wt+\alpha)$, means for deriving a further voltage proportional to $$d\frac{(wt+\alpha)}{dt}$$

means for multiplying said first and further voltages to obtain a product voltage, means for sampling said product voltage substantially at times $qt=0$ and $qt=\pi$ to obtain sample pulses, and means responsive to said sample pulses for constructing a wave having an amplitude at each instant proportional to the frequency deviations of one of said frequency modulated waves from a mean frequency.

2. In combination, a source of two overlapping frequency modulated waves having a beat envelope $R \sin (wt+\alpha)$, where $w$ is the instantaneous angular frequency of one of said waves, and $\alpha$ the phase angle between the vector representative of said one of said waves and the vector representative of the sum of said waves, and where $q$ is the instantaneous angular beat frequency between said waves, means for deriving a signal proportional to the amplitude of the envelope of $R \sin (wt+\alpha)$ multiplied by $$d\frac{(wt+\alpha)}{dt}$$

means for sampling said signal at times adjacent $q=0$ and $q=\pi$ to obtain sample signals, and means responsive to said sample signals for generating a further signal having an amplitude which is a function at each instant of the frequency of one of said two overlapping frequency modulated waves.

3. In combination, a source of two overlapping frequency modulated waves having a beat envelope $R \sin (wt+\alpha)$, where $w$ is the instantaneous angular frequency of one of said waves, where $\alpha$ is the instantaneous phase angle between the said one of said waves and the sum of said wave, and where $q$ is the instantaneous angular beat frequency between said waves, means for deriving signals proportional to the product of the amplitude of the envelope of $R \sin (wt+\alpha)$ by $$d\frac{(wt+\alpha)}{dt}$$

taken substantially only at times $q=0$ and $q=\pi$, and means responsive to said signals for developing a wave which is a function of the frequency of any selected one only of said two overlapping frequency modulated waves.

4. In combination, a source of two overlapping frequency modulated waves, the first of said waves having an angular velocity of $w$ radians per second, and the second having an angular velocity of $w+q$ radians per second, and said second wave having an amplitude $a$ times that of the first wave, where $a$ is less than 1, means for deriving from said waves a first signal having an amplitude which is a function of the angular velocity $w(1+a)+qa$ and a further signal having an amplitude which is a function of the angular velocity $w(1-a)-qa$, and means for combining said signals to derive another signal having an amplitude which is a function of the angular velocity $2a(w+q)$ only.

5. In combination, a source of two overlapping frequency modulated waves, the first of said waves having an angular velocity of $w$ radians per second, and the second having an angular velocity of $w+q$ radians per second, and said second wave having an amplitude $a$ times that of the first wave, where $a$ is less than 1, means for deriving from said waves a first signal having an amplitude which is a function of the angular velocity $w(1+a)+qa$ and a further signal having an amplitude which is a function of the angular velocity $w(1-a)-qa$, and means for combining said signals to derive another signal having an amplitude which is a function of the angular velocity $2w$ only.

6. In combination, a source of two overlapping frequency modulated waves, the first of said waves having an angular velocity of $w$ radians per second and the second having an angular velocity of $w+q$ radians per second, and said second wave having an amplitude $a$ times that of said first wave, $a$ less than 1, means for deriving from said waves a pulse having amplitude which is a function of the angular velocity $w(1+a)+qa$ and further pulses having amplitude $w(1-a)-qa$, and means responsive to said pulses to derive a signal having an amplitude which is a function of the angular velocity $w+q$ only.

7. In combination, a source of two overlapping frequency modulated waves, the first of said waves having an angular velocity of $w$ radians per second and the second having an angular velocity of $w+q$ radians per second, and said second wave having an amplitude $a$ times that of said first wave, $a$ less than 1, means for deriving from said waves pulses having amplitude which is a function of the angular velocity $w(1+a)+qa$ and further pulses having amplitude which is a function of the angular velocity $w(1-a)-qa$, and means responsive to said pulses to derive a signal having an amplitude which is a function of the angular velocity $w$ only.

8. In combination a source of two overlapping frequency modulated waves, the first of said waves having an angular velocity of $w$ radians per second and the second having an angular velocity of $w+q$ radians per second, and said second wave having an amplitude $a$ times that of said first wave, $a$ less than 1, means for deriving, from said waves pulses having amplitude which is a function of the angular velocity $w\ (1+a)+qa$ and further pulses having amplitude $w(1-a)-qa$, and means responsive to said pulses for deriving separate signals having amplitudes which are functions of $w$ and $w+q$ respectively.

9. In combination, a source of two overlapping frequency modulated waves $E_1$ and $E_2$, the wave $E_1$ having an angular velocity $w$ and the wave $E_2$ an angular velocity $w+q$, where $$\frac{E_2}{E_1}=a$$

and $a$ is less than 1, and where the vector sum of $E_1$ and $E_2=R \sin (wt+\alpha)$, $\alpha$ being the angle between R and $E_1$, means for deriving the modulation of the wave $E_2$ comprising means for deriving pulses from said overlapping waves at times when $qt=0$ and $\pi$ only, and means responsive to said pulses for constructing said modulation.

10. In combination, a source of two overlapping frequency modulated waves $E_1$ and $E_2$, the wave $E_1$ having an angular velocity $w$ and the wave $E_2$ an angular velocity $w+q$, where $$\frac{E_2}{E_1}=a$$

and $a$ is less than 1, and where the vector sum of $E_1$ and $E_2$ is $R \sin (wt+\alpha)$, $\alpha$ being the angle between R and $E_1$, means for deriving the modulation of the wave $E_2$ to the exclusion of interference from the wave $E_1$ or from the modulation thereof, comprising, means for deriving pairs of pulses corresponding in amplitude with $$R\frac{d(wt+\alpha)}{dt}$$

at times substantially equal and adjacent to $qt=0$ and to $qt=\pi$, and means for subtracting the pulses of each pair to obtain signals proportional to the modulation of signal $E_2$.

References Cited in the file of this patent

UNITED STATES PATENTS

| | | |
|---|---|---|
| 2,252,058 | Bond | Aug. 21, 1941 |
| 2,295,207 | Gabrilovitch | Sept. 8, 1942 |
| 2,371,416 | Tunick | Mar. 13, 1945 |

OTHER REFERENCES

Belles: "Reduction of Heterodyne Interference," Electronics, December 1945, pages 150 and 151.